March 17, 1959  W. L. MORSE  2,877,561
ANGULAR POSITION INDICATOR
Filed May 16, 1955
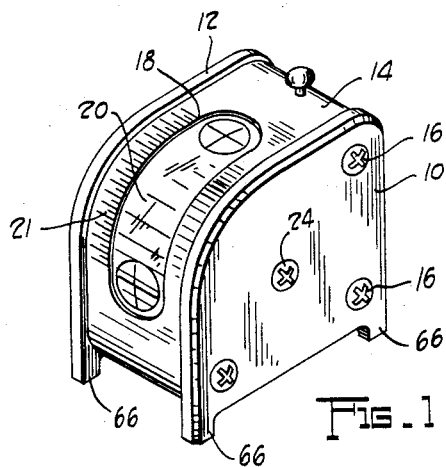
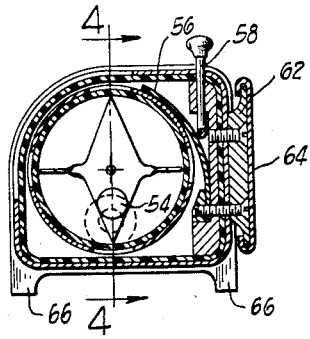
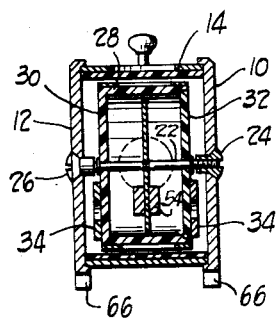
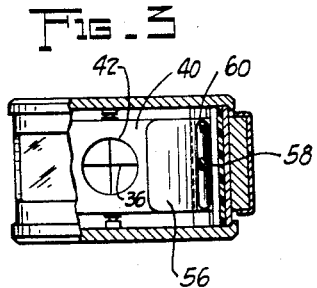
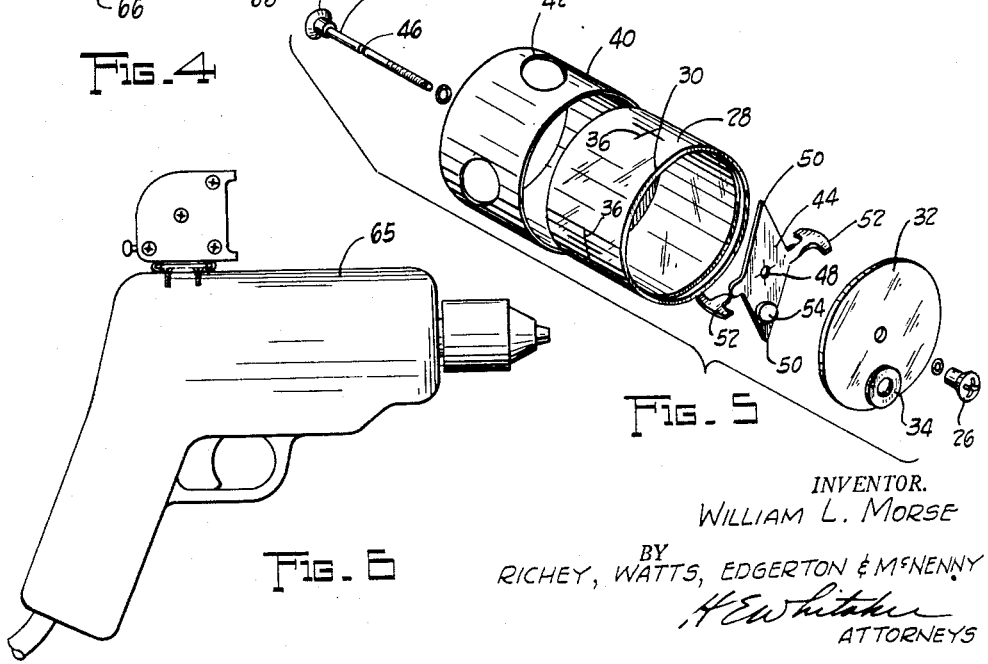
INVENTOR.
WILLIAM L. MORSE
BY
RICHEY, WATTS, EDGERTON & McNENNY
ATTORNEYS

United States Patent Office

2,877,561
Patented Mar. 17, 1959

2,877,561
ANGULAR POSITION INDICATOR
William L. Morse, Seattle, Wash.

Application May 16, 1955, Serial No. 508,740

8 Claims. (Cl. 33—215)

This invention relates to position indicators and more particularly to position indicators for hand drills which will give the operator an indication of a pre-selected operational condition.

One of the objects of this invention is to provide a position indicator which may be attached to a power tool and to accurately indicate the position of the tool relative to horizontal during operation.

Another object of this invention is to provide a position indicator for a power tool which facilitates the operation of the tool at some pre-selected angle which may be accurately repeated.

Another object of this invention is to provide a means for the operator of a tool which will indicate the degree of angularity of the tool relative to the work as well as the angularity of the tool relative to gravity.

A still further object of this invention is to provide a position indicator quick-releasably attached to a power tool which may be calibrated by application to the work and then installed on the tool for indicating the position of the tool relative to the work while it is being used.

In the operation of a power tool such as a hand drill, the correct orientation of the tool relative to the work ordinarily depends on the skill of the operator to estimate the position of the tool without benefit of mechanical aids.

Spirit levels and pendulum levels have been attached to such tools but the use of such devices has been limited to indication of angularity of the tool relative to gravity pull rather than to the work. In other instances, telescoping tripod arrangements have been used which engage the work but such devices are limited to a single position perpendicular to the work and require a flat area surrounding the point of engagement. In order to be completely useful, the indicator must function equally well in any position in which the tool may be used. It must indicate the tool's position relative to the work as well as to gravity. In addition, the indicator must not be limited to flat surfaces but be equally functionable on concave or convex surfaces. Further, the indication must be easily followed as well as adjustable to any desired orientation by a simple manipulation of a control element.

The device which forms the preferred embodiment of my invention responds to these requirements by being equally useful in any position as well as having a preselector lock for predetermining a position in which the tool is to be used. This position indicator finds particular usefulness in the operation of a powered hand drill as an assistance to the operator in performing the drilling operation at the optimum angle to the work. Once the optimum angle is determined, it is possible for the operator by using the device to drill uniformly accurate holes without particular skill or experience being required.

Accordingly, it is the most important object of this invention to provide a position indicator which may be used with a hand tool in any position to aid the operator in using such a tool to obtain accuracy in results not obtainable by other means.

In the drawings:

Fig. 1 is a perspective view of the position indicator which forms the preferred embodiment of my invention.

Fig. 2 is a longitudinal sectional view of the indicator.

Fig. 3 is a top plan view with parts cut away for purposes of clarity.

Fig. 4 is a sectional view taken along line 4—4 of Fig. 2.

Fig. 5 is an exploded perspective view showing the operative parts; and

Fig. 6 is an assembly view showing the device mounted on a hand drill.

Referring first to Fig. 1, the position indicator is shown having end plates 10 and 12 and a casing 14 which form a hollow housing for enclosing the operative parts of the device. The plates 10 and 12 are held in assembled relation with the casing 14 by a plurality of screws 16 which pass through the end plates 10 and 12 and are threadably engaged with the casing 14. A slot 18 is formed in the casing 14 and extends from the vertical axis of the device to the horizontal axis. A transparent sheet 20 is affixed to the inner wall of the casing 14 and closes the slot 18 while allowing the user to observe the indicator therethrough.

A scale 21 is provided on the casing 14 adjacent the slot 18. One end of the scale 21 is on the vertical center line of the operating mechanism while the other end of the scale 21 is at the horizontal center line when the indicator is at rest on a horizontal surface. Ninety degrees (90°) of arc is provided to give an indication at any angle to the horizontal or vertical.

A shaft 22 is threadably mounted in screws 24 and 26 which releasably support the shaft 22 in the end plates 10 and 12 respectively. A drum 28 of transparent material is formed in a cylinder having an end 30 affixed thereto. An end 32 is releasably mounted on the opposite end of the drum from end 30 for supporting the drum 28 in cylindrical shape. The ends 30 and 32 are apertured at their centers to receive the shaft 22 for carrying the drum 28 for free rotation. A pair of weights 34 are affixed to the ends 30 and 32 of the drum near the periphery thereof for positioning the drum by utilizing the force of gravity. Cross-hair markings 36 are disposed on the drum 28 at quadrant points having one line parallel to the axis of rotation and the other line perpendicular thereto. One of the cross-hair patterns is located in alignment with the weights 34 with the result that when the drum is free to rotate two of said cross-hair patterns are vertically opposed and the other two cross-hair patterns are horizontally opposed.

An opaque sleeve 40 having apertures 42 formed therein is applied to the outer surface of the drum 28. The apertures 42 are positioned in the sleeve 40 to coincide with the cross-hairs 36, thus outlining the cross-hairs as indices or reticles to facilitate the use of the device. It is noted that paint may be used in lieu of the sleeve 40 to define the index areas.

A pointer 44 in the form of a star wheel having four points is mounted at the longitudinal center of the shaft 22 with the plane of the wheel in line with the circumferential lines of the cross-hair pattern. A groove 46 is formed in the shaft 22 for receiving a knife edge in the aperture of the pointer 44, thus providing for the rotation of the pointer 44 as well as angular deflection relative to the axis of rotation. The pointer 44 has two diagonally opposed points 50 and two diagonally opposed bars 52, the bars 52 being parallel to the axis of rotation of the pointer 44. Weights 54 are applied to the pointer 44 adjacent one of the points 50 in order that gravity may maintain the opposed points 50 in a vertical position at all times and the opposed bars 52 in a horizontal position. Accordingly, when the drum 28 and the pointer 44 are free to rotate, the unweighted point 50 will coincide with the uppermost cross-hair 36. Likewise, the bars 52 will coincide with the axially disposed cross-hair at the horizontally disposed indices.

A brake 56 which is preferably formed from a thin sheet of steel frictionally engages the sleeve 40 on the outer surface of the drum 28 to restrain the drum 28 in a preselected position upon inward movement of the control pin 58, and the brake 56 is urged against the drum 28. The control pin 58 has a cross-bar mounted on the end thereof to distribute the force of the brake 56. Upon outward movement of the pin 58, the brake 56 is released and the drum 28 is again free to revolve as determined by the position of the weight 54.

To facilitate the mounting of the indicator on a tool, a bracket 62 is affixed to the casing 14. A clip 64 which is quickly releasable from the bracket 62 is provided for attachment to a tool 65 as shown in Fig. 6. The clip 64 and bracket 62, therefore, provide an arrangement for easily and simply applying the indicator to the tool and removing it as required during operation.

Legs 66 are located at the lower side of the end plates 10 and 12 and are accurately placed with the plane of the ends of the legs 66 being perpendicular to the face of the bracket 62 and parallel to the horizontal indication on the scale 21.

In operation, the position indicator is placed on the plane of the work with the locking pin 58 in the unlocked position. The feet 66 engage the work in such a manner that an accurate calibration may be had on convex and concave surfaces as well as flat surfaces. After the drum 28 has come to rest, the locking pin 58 is adjusted to apply the brake 56 to the drum 28. This automatic calibration to the plane of the work is then locked into the device and will remain there until the brake 56 is retracted.

The position indicator is then snapped onto a tool 65 whereupon the operator can observe the pointer 44 through the window 20. To enhance the visibility of the points 50 and the bars 52 on the pointer wheel 44, a luminescent paint may be applied to these areas which will render them easily visible with the minimum of external light. When the operator of the drill 65 returns the tool to the desired position either a pointer 50 or a bar 52 will appear at the intersection of the cross-hairs 36 in an index opening 42. It is noted that at least one index will be visible in the observation slot 18 regardless of the position of the tool 65. Since the index carrier is locked and the pointer wheel is free to move at all times, the indicator will provide the necessary data to return the tool to the original position or at some quadrant angle thereto. Until the brake 56 is released, the operations may be repeated and the only reading required of the operator is to return the needle indicator to the intersection of the cross-hairs 36.

It is noted that when the drum 28 is free to rotate, the cross-hair of the index which is parallel to the axis will give the angle of inclination directly from the scale 21 of the surface to which the instrument is applied. Also when the tool 65 is operated in a vertical or horizontal position the instrument will read directly without operation of the brake 56. To fix the indices on the horizontal and vertical planes, the feet are placed on a horizontal or vertical surface and the locking pin 58 is actuated to hold the index carrier in that position. The removal of the instrument from the tool 65 may be avoided by providing a reference surface on the tool parallel or perpendicular to the feet 66 which may be used to engage the work in the calibration step of the operation of the device.

What is claimed is:

1. An indicating device comprising a housing, a weighted pointer pivotally mounted in said housing for rotational and axial deflection, a weighted index carrier rotatably mounted in the housing, said carrier having a plurality of indices and said pointer having a plurality of points, said points and said indices coinciding in one position of the pointer and carrier respectively, and an aperture in said housing for viewing said pointer and said index carrier.

2. An indicating device comprising a housing, a weighted pointer pivotally mounted in said houing for rotational and axial deflection, a weighted index carrier rotatably mounted in the housing, said carrier having a plurality of indices and said pointer having a plurality of points, said points and said indices coinciding in one position of the pointer and carrier respectively, locking means in the housing for holding the carrier in a pre-selected position, and an aperture in said housing for viewing said pointer and said index carrier.

3. An indicating device comprising an apertured housing, a weighted pointer pivotally mounted in said housing for axial deflection and rotation through 360° of arc, said pointer having at least two normally vertical points and at least two normally horizontal bars thereon, said bars being disposed in a generally axial direction, a weighted index carrier rotatably mounted in the housing, said carrier having an index for each of said points and bars in the form of cross-hairs, said points and said bars coinciding with said indices in one position of the pointer and carrier respectively, and locking means in the housing for holding the index carrier in a preselected position.

4. An indicating device comprising an apertured housing, a weighted pointer pivotally mounted in said housing for axial deflection and rotation through 360° of arc, said pointer having at least two normally vertical points and at least two normally horizontal bars thereon, said bars being disposed in a generally axial direction, a weighted index carrier rotatably mounted in the housing, said carrier having an index for each of said points and bars in the form of cross-hairs, said points and said bars coinciding with said indices in one position of the pointer and carrier respectively, and locking means in the housing for holding the carrier in a preselected position, said aperture in the housing being adapted to expose to view at least two of said indices simultaneously.

5. An indicating device comprising an apertured housing, a weighted pointer pivotally mounted in said housing for axial deflection and rotation through 360° of arc, said pointer having two normally vertical points and two normally horizontal bars thereon, said bars being disposed in a generally axial direction, a weighted index carrier mounted for rotation in the housing through 360° of arc, said carrier having an index for each of said points and bars in the form of cross-hairs, said points and said bars coinciding with said indices in four relative positions of the pointer and carrier respectively, and locking means in the housing for holding the carrier in a preselected position, said aperture in the housing being adapted to expose to view at least two of said indices simultaneously.

6. An indicating device comprising an apertured housing, a weighted pointer pivotally mounted in said housing for axial deflection and rotation through 360° of arc, said pointer having two normally vertical points and two normally horizontal bars, said bars being disposed in a generally axial direction, a weighted drum-like index carrier having an index for each of said points and bars in the form of cross-hairs on the periphery of said carrier, said points and said bars coinciding with said indices in four relative positions of the pointer and carrier respectively, and locking means in the housing for holding the index carrier in a preselected position.

7. An indicating device comprising an apertured housing, a weighted pointer pivotally mounted in said housing for axial deflection and rotation through 360° of arc, said pointer having two normally vertical points and two normally horizontal bars, said bars being disposed in a generally axial direction, a weighted drum-like index carrier having an index for each of said points and bars in the form of cross-hairs on the periphery of said carrier, said points and said bars coinciding with said indices in four relative positions of the pointer and carrier respectively, and locking means in the housing for holding the carrier in a preselected position, said aperture in the housing being opposite the periphery of said carrier and adapted to expose to view at least two of said indices simultaneously.

8. An indicating device comprising an apertured housing, a weighted pointer pivotally mounted in said housing for axial deflection and rotation through 360° of arc, said pointer having two normally vertical points and two normally horizontal bars, said bars being disposed in a generally axial direction, a weighted drum-like index carrier having an index for each of said points and bars in the form of cross-hairs on the periphery of said carrier, said points and said bars coinciding with said indices in four relative positions of the pointer and carrier respectively, and a flexible strip in the housing engageable with the periphery of the carrier for holding the carrier in a preselected position, said aperture in the housing being opposite the periphery of said carrier and adapted to expose to view at least two of said indices simultaneously.

References Cited in the file of this patent

UNITED STATES PATENTS

| | | |
|---|---|---|
| 36,312 | Thayer | Aug. 26, 1862 |
| 313,290 | Cramer | Mar. 3, 1885 |
| 474,861 | Rush | May 17, 1892 |
| 901,727 | McKeen | Oct. 20, 1908 |
| 1,590,136 | Valentine | June 22, 1926 |
| 1,792,687 | Ficklin | Feb. 17, 1931 |
| 1,912,536 | Mobley | June 6, 1933 |
| 2,350,103 | Fanger | May 30, 1944 |
| 2,565,381 | Leighton | Aug. 21, 1951 |